US009959946B2

(12) United States Patent
Qi et al.

(10) Patent No.: US 9,959,946 B2
(45) Date of Patent: May 1, 2018

(54) CONDUCTIVE GRAPHENE-METAL COMPOSITE MATERIAL, THE PRODUCTION METHOD OF THE SAME AND USE OF THE SAME

(71) Applicant: Boe Technology Group Co., Ltd., Beijing (CN)

(72) Inventors: Yonglian Qi, Beijing (CN); Chuanxiang Xu, Beijing (CN); Shi Shu, Beijing (CN); Jianshe Xue, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 140 days.

(21) Appl. No.: 15/073,077

(22) Filed: Mar. 17, 2016

(65) Prior Publication Data

US 2016/0196890 A1 Jul. 7, 2016

Related U.S. Application Data

(62) Division of application No. 14/095,443, filed on Dec. 3, 2013.

(30) Foreign Application Priority Data

Dec. 3, 2012 (CN) .......................... 2012 1 0510021

(51) Int. Cl.
*H01B 1/04* (2006.01)
*C01B 31/02* (2006.01)
(Continued)

(52) U.S. Cl.
CPC ................. *H01B 1/02* (2013.01); *H01B 1/04* (2013.01)

(58) Field of Classification Search
CPC ......... B82Y 30/00; B82Y 40/00; C01B 32/23; C01B 32/184; C01B 32/192;
(Continued)

(56) References Cited

U.S. PATENT DOCUMENTS

2011/0040007 A1* 2/2011 Chandrasekhar ........ H01B 1/22 524/404
2011/0108978 A1 5/2011 Kim et al.
(Continued)

FOREIGN PATENT DOCUMENTS

CN 101728535 A 6/2010
CN 101937994 A 1/2011
(Continued)

OTHER PUBLICATIONS

Zhou ("Graphene-Wrapped Fe3O4 Anode Material with Improved Reversible Capacity and Cyclic Stability for Lithium Ion Batteries." Chem. Mater. 2010, 22, 5306-5313) (Year: 2010).*
(Continued)

*Primary Examiner* — Tri V Nguyen
(74) *Attorney, Agent, or Firm* — Kinney & Lange, P.A.

(57) ABSTRACT

A production process of a conductive material includes processing graphite oxide into a graphene suspension comprising graphene monolayer nanoflakes, and processing the graphene suspension and metal or metal oxide so as to provide a liquid comprising a composite as the conductive material.

12 Claims, 1 Drawing Sheet

(51) Int. Cl.
*B82Y 40/00* (2011.01)
*H01B 1/02* (2006.01)

(58) Field of Classification Search
CPC ..... C01B 32/194; C01B 32/19; C01B 32/225; H01B 1/18; H01B 1/24; H01B 1/02; H01B 1/04
USPC ..... 423/415.1, 448, 460; 252/502, 506–508; 977/734, 810
See application file for complete search history.

(56) References Cited

U.S. PATENT DOCUMENTS

| | | | | | |
|---|---|---|---|---|---|
| 2011/0268647 | A1* | 11/2011 | Ivanovici | B01J 21/08 | 423/448 |
| 2012/0265122 | A1* | 10/2012 | El-Shall | A61K 41/0052 | 604/20 |
| 2014/0042390 | A1* | 2/2014 | Gruner | H01M 4/364 | 257/14 |
| 2014/0170483 | A1* | 6/2014 | Zhang | H01M 4/0428 | 429/211 |
| 2014/0197353 | A1* | 7/2014 | Hong | C04B 35/01 | 252/71 |
| 2016/0168391 | A1* | 6/2016 | Costa | C09D 5/106 | 428/408 |

FOREIGN PATENT DOCUMENTS

| | | | | |
|---|---|---|---|---|
| CN | 102208639 | A | 10/2011 | |
| CN | 102709236 | A | 10/2012 | |
| CN | 102757041 | A | 10/2012 | |
| JP | 2011003456 | A | 1/2011 | |
| KR | 101265712 | B1 * | 5/2013 | B10J 19/10 |
| WO | 2011132036 | A1 | 10/2011 | |

OTHER PUBLICATIONS

Yang (“Chemical analysis of graphene oxide films after heat and chemical treatments by X-ray photoelectron and Micro-Raman spectroscopy.” C A R B O N 4 7(2 0 0 9)1 4 5-1 5 2) (Year: 2009).*

Moon (“Photochemical loading of metal nanoparticles on reduced graphene oxide sheets using phosphotungstate.” C A R B ON 4 9 ( 2 0 1 1) 3 4 5 4-3 4 6 2) (Year: 2011).*

Wang et al., “Reinforcement with graphene nanosheets in aluminum matrix composites”, Scripta Mater, 66(8), pp. 594-597, online Jan. 16, 2012.

English translation of first Chinese Office Action dated Sep. 19, 2014 for corresponding Chinese Application No. 201210510021.9.

English translation of second Chinese Office Action dated Dec. 29, 2014 for corresponding Chinese Application No. 201210510021.9.

* cited by examiner

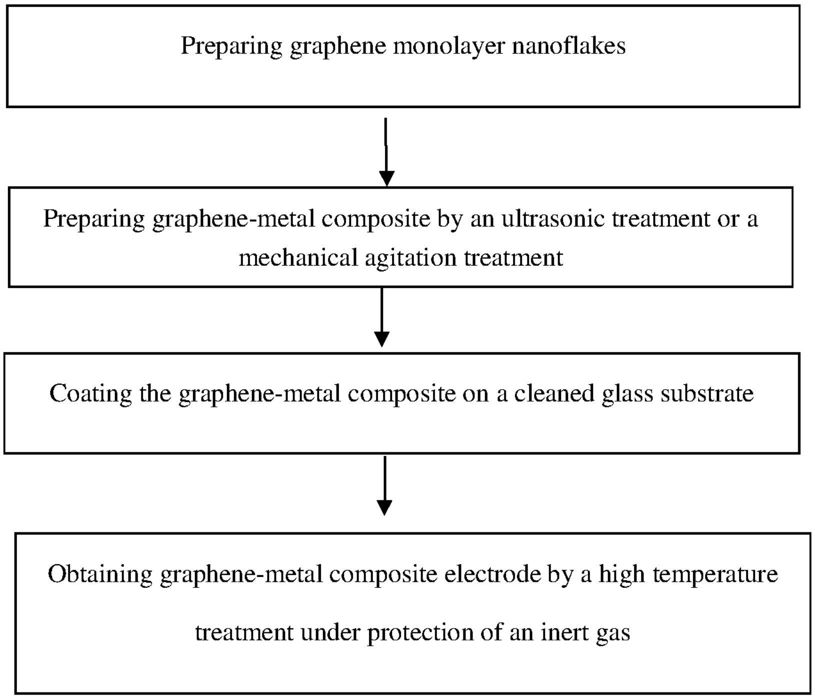
Preparing graphene monolayer nanoflakes
Preparing graphene-metal composite by an ultrasonic treatment or a mechanical agitation treatment
Coating the graphene-metal composite on a cleaned glass substrate
Obtaining graphene-metal composite electrode by a high temperature treatment under protection of an inert gas

CONDUCTIVE GRAPHENE-METAL COMPOSITE MATERIAL, THE PRODUCTION METHOD OF THE SAME AND USE OF THE SAME

CROSS-REFERENCE TO RELATED APPLICATION(S)

The present application is a divisional of U.S. patent application Ser. No. 14/095,443, filed Dec. 3, 2013, which claims priority to Chinese Application 201210510021.9 filed Dec. 3, 2012.

TECHNICAL FIELD

The invention relates to a conductive graphene material, specifically, to a conductive graphene-metal composite material, the production method of the same and the use of the same.

BACKGROUND

Nowadays, the primary raw material for the transparent conductive layer of the array substrate and the colorfilm substrate in the production of liquid crystal displays is indiumtin oxide (ITO), which is a metal oxide. ITO can provide high optical transparency and relatively good conductivity. However, it exhibits conductivity lower than metals such as gold and silver. Thus, there are some limitations when it is used in the fields of touch screens, displays, plasma displays, etc. Additionally, the abrasion resistance of the ITO film is relatively poor, and at the same time the cost of indium, which is the main component of ITO, is relative high, therefore, the use of optical film having better properties, such as graphene-metal composite electrode, has become a trend.

The monolayer graphene is a two-dimensional structure of a closely packed atomic monolayer. The specific electronic configuration thereof determines its excellent electrical property. In the monolayer graphene, carbon atoms periodically arrange in the graphite plane in the form of six-membered ring. Each carbon atom binds three adjacent carbon atoms via a bonds. The three hybridization orbitals, i.e. S, Px and Py, form an sp2 hybrid orbital, which imparts the graphene extremely high mechanical properties. The remaining $\pi$ electrons in the Pz orbital form a $\pi$ orbital in the direction perpendicular to the plane. The $\pi$ electrons can move in the plane of the graphene crystal, which allows the graphene to possess a good conductivity. Furthermore, investigations indicate that transparency of a graphene electrode would not be affected when it combines in a grid style with metal having small size.

Therefore, it is possible to develop a new alternative conductive material for indium tin oxide (ITO) for the production of the conductive layer used in liquid crystal displays, by utilizing the superior conductivity and transparency of the graphene.

SUMMARY OF THE INVENTION

An object of the invention is to overcome the disadvantages mentioned above, that is, to provide a conductive graphene-metal composite material with low price, good conductivity and superior transparency.

Another object of the invention is to provide a production process of said conductive graphene-metal composite material.

A further object of the invention is to provide said conductive graphene-metal composite material in use for manufacturing a conductive layer of a liquid crystal display.

In order to achieve the objects of the invention, embodiments of the invention provides a conductive material, which is a composite of monolayer graphene nanoflakes and metal or metal oxide.

The conductive material can be used as an electrode material.

Here, aluminium is preferably adopted as the metal, and aluminium oxide is preferably adopted as the metal oxide.

The weight ratio between the monolayer graphene nanoflakes and the metal or the metal oxide is 1:50-1:600, preferably 1:100-1:400.

The monolayer graphene nanoflakes are prepared from graphite oxide preferably by a rapid thermal exfoliation method or a solvothermal method, preferably by a rapid thermal exfoliation method.

The conductive material is prepared by subjecting monolayer graphene nanoflakes and a metal or metal oxide to phase coating and mixing, preferably by an ultrasonic treatment or a mechanical agitation treatment to form a composite of monolayer graphene nanoflakes and a metal or metal oxide.

An embodiment of the invention provides a production process of a conductive material, characterized by including the steps of:

processing graphite oxide into a graphene suspension comprising monolayer graphene nanoflakes; and processing the graphene suspension and metal or metal oxide so as to provide a liquid comprising a composite as the conductive material.

The step of processing the graphite oxide into a graphene suspension comprising monolayer graphene nanoflakes may include processing the graphite oxide into a graphene suspension comprising monolayer graphene nanoflakes by utilizing a rapid thermal exfoliation method or a solvothermal method.

The step of processing the graphite oxide into a graphene suspension comprising monolayer graphene nanoflakes may include:

subjecting the graphite oxide to a heat treatment;

adding absolute ethanol into the treated graphite oxide; and subjecting the treated graphite oxide with absolute ethanol added therein to an ultrasonic treatment or a mechanical agitation treatment.

Subjecting the graphite oxide to a heat treatment may include heat treating the graphite oxide at a temperature of 850-1300° C. for 30-50 sec.

The step of processing the graphite oxide into a graphene suspension comprising monolayer graphene nanoflakes may include:

subjecting the graphite oxide to a heat treatment;

adding absolute ethanol into the treated graphite oxide; and subjecting the graphite oxide with absolute ethanol added therein to an ultrasonic treatment, wherein the power of the ultrasound is 80-150 W and the time of the ultrasonic treatment is 2-2.5 h.

In an embodiment, the weight ratio of the graphite oxide to the absolute ethanol may be 1:20-1:100.

The step of processing the graphene suspension and metal or metal oxide so as to provide a liquid comprising a composite may include: subjecting the graphene suspension and metal or metal oxide to an ultrasonic treatment or a mechanical agitation treatment so as to provide a liquid comprising a composite.

The step of processing the graphene suspension and metal or metal oxide so as to provide a liquid comprising a composite may include:

mixing the graphene suspension and a solvent, so as to provide a mixture;

subjecting the mixture to ultrasonic dispersion, so as to provide a ultrasonically dispersed mixture; and mixing the ultrasonically dispersed mixture and a salt solution comprising the metal and performing an agitation treatment on it, so as to provide the liquid comprising a composite.

In an embodiment, the solvent may be N-methyl-2-pyrrolidone.

In an embodiment, the ultrasonic dispersion may include dispersion of 20-60 min under an ultrasound of 80-150 W.

In an embodiment, the salt solution comprising the metal may be a solution comprising $Al^{3+}$ and $SO_4^{2-}$.

In an embodiment, the duration of the agitation treatment may last 5-10 h.

In an embodiment, the weight ratio of the graphene in the graphene suspension to the metal in the salt solution comprising the metal may be 1:50-1:600.

Specifically, the production process of a conductive graphene-metal composite material of an embodiment the invention includes the steps of:

processing graphite oxide into a graphene suspension comprising monolayer graphene nanoflakes by a rapid thermal exfoliation method or a solvothermal method; and compounding the graphene suspension comprising monolayer graphene nanoflakes and metal so as to provide a composite by an ultrasonic treatment or a mechanical agitation treatment;

finally, treating it at high temperature, so as to provide the conductive graphene-metal composite material.

Said ultrasonic treatment or a mechanical agitation treatment includes:

mixing the graphene suspension and a solvent, so as to provide a mixture;

subjecting the mixture to ultrasonic dispersion, so as to provide a ultrasonically dispersed mixture; and mixing the ultrasonically dispersed mixture and a salt solution comprising the metal and stirring it, so as to provide the liquid comprising a composite.

Specifically, the rapid thermal exfoliation method in the step 1) is: firstly, heat treating the graphite oxide at a temperature of 850-1300° C. for 30-50 sec; subsequently, adding absolute ethanol therein; then, treating it under an ultrasound of 80-150 W for 2-2.5 h, so as to provide a graphene suspension comprising monolayer graphene nanoflakes, wherein the weight ratio of the graphite oxide to the absolute ethanol is 1:20-1:100.

The ultrasonic treatment in the step 2) is: adding the graphene suspension into a solution of N-methyl-2-pyrrolidone, dispersing it under an ultrasound of 80-150 W for 20-60 min, adding a mixed solution comprising $Al^{3+}$ and $SO_4^{2-}$, and stirring it for 5-10 h. In other words, in the ultrasonic treatment or the mechanical agitation treatment step 2), the solvent is N-methyl-2-pyrrolidone. The ultrasonic dispersion includes a dispersion of 20-60 min under an ultrasound of 80-150 W, the salt solution comprising the metal is a solution comprising $Al^{3+}$ and $SO_4^{2-}$, and the stirring lasts 5-10 h.

Here, the weight ratio of the graphene in the graphene suspension to the aluminium in the salt solution comprising $Al^{3+}$ and $SO_4^{2-}$ is 1:50-1:600, preferably 1:100-1:400.

The high temperature treatment in the step 3) removes the solvent in the composite, and ultimately makes the monolayer graphene nanoflakes and the metal or metal oxideform a conductive network.

The invention adopts an ultrasonic treatment or a mechanical agitation treatment. This can ensure a good combination between the metal material and graphite active substance; and the method of mechanical agitation can avoid that the graphene disperses non-uniformly and that it is hard to form a conductive network. This can improve the electrochemical activity efficiently and reduce the resistance against the transfer of the charges efficiently.

The conductive graphene-metal composite material can be used as a conductive electrode used in a transparent conductive layer of a liquid crystal display, for example, a pixel electrode of an array substrate, and an electrostatic shielding layer in a color film substrate.

When a conductive layer is produced by using the graphene-metal composite material of the invention, following process can be used:

coating the graphene-metal composite on an array substrate or a lower substrate in a FFS mode, wherein all other layers have been prepared on the substrate previously; and then treating it at high temperature under protection of an inert gas, so as to provide the conductive layer.

During the production, the substrate must be cleaned previously, by such as washing it with an agent, rinsing it with water directly, drying it with air knife, etc.

In step 1), the graphene-metal composite is spin coated on the substrate by a dipping process.

In step 2), the temperature of the high temperature treatment is 100-250° C.

The substrate of the liquid crystal display of the invention comprises a transparent conductive layer, which is formed of the conductive material mentioned above.

The liquid crystal display of the invention comprises a substrate, which comprises a transparent conductive layer, which is composed of the conductive material mentioned above.

The graphene-metal composite conductive material of the invention has the following advantages.

Themonolayer graphene nanoflakes adopted have a high conductivity and a large aspect ratio. The use of ultrasonic treatment and/or the mechanical agitation treatment can ensure a good combination between the metal material and graphite active substance. And the method of mechanical agitation can avoid that the graphene disperses non-uniformly and that it is hard to form a conductive network. This can improve the electrochemical activity efficiently and reduce the resistance against the transfer of the charges efficiently.

Because the nature of the material and the production process thereof are excellent, monolayer graphene nanoflakes have a character that it is more transparent. By the network formed by compounding it with the metal material, the electron conductivity of the monolayer graphene nanoflakes is much higher.

When being compounded with metal, the transparency of the conductive material would not be affected due to that the metal exists in a nano state.

On the premise of that the graphene-metal composite electrode of the invention has good properties, the cost of the current process for sputtering ITO with a sputter can be reduced, and the costs of the processes and facilities can be reduced, therefore, this material can be used for replacing the ITO conductive layer of the liquid crystal display.

BRIEF DESCRIPTION OF THE DRAWING

FIG. 1 is a flow chart of the production process of the graphene-metal composite electrode of the invention.

DETAILED DESCRIPTION

The Examples below are provided to illustrate the invention, but not limit the scope of the invention.

The conductive graphene-metal composite material of the invention is a composite of monolayer graphene nanoflakes and metal or metal oxide. The metal or metal oxide can be aluminium and aluminium oxide, respectively. As the metal, a metal that is appropriate in terms of conductivity and price or cost, preferably aluminium, can be adopted. Other metal also can be used, such as Ag.

The conductive material is prepared by subjecting monolayer graphene nanoflakes and a metal or metal oxide to a phase coating and mixing by an ultrasonic treatment or a mechanical agitation treatment.

The weight ratio between the monolayer graphene nanoflakes and aluminium or aluminium oxide is 1:50-1:600, preferably 1:100-1:400.

The monolayer graphene nanoflakes are prepared from graphite oxide by a rapid thermal exfoliation method or a solvothermal method, preferably by a rapid thermal exfoliation method. Monolayer graphene nanoflakes thus obtained have high conductivity and large aspect ratio.

The production process of the conductive graphene-metal composite material of the invention includes steps of:

processing graphite oxide into a graphene suspension comprising monolayer graphene nanoflakes by a rapid thermal exfoliation method;

specifically, firstly heat treating the graphite oxide at a temperature of 850-1300° C. for 30-50 sec, subsequently adding absolute ethanol therein, then treating it under an ultrasonic wave of 80-150 W for 2-2.5 h, so as to provide a graphene suspension comprising monolayer graphene nanoflakes, wherein the weight ratio of the graphite oxide to the absolute ethanol is 1:20-1:100;

2) compounding the graphene suspension comprising monolayer graphene nanoflakes and metal or metal oxide material so as to provide a composite by an ultrasonic wave treatment or a mechanical agitation treatment;

specifically, adding the graphene suspension into a solution of N-methyl-2-pyrrolidone, dispersing it under an ultrasonic wave of 80-150 W for 20-60 min, adding a mixed solution (the solution can be a salt solution or alkali solution comprising the metal) comprising $Al^{3+}$ and $SO_4^{2-}$, and stirring it under a rate of the agitation of 500-1000 rpm for 5-10 h, wherein it is desired that the amount of the N-methyl-2-pyrrolidone added ensures the good dispersion of the graphene, and preferably the volume ratio of the graphene suspension to the solution of N-methyl-2-pyrrolidone is 1:1-1:5;

The weight ratio of the graphene in the graphene suspension to the aluminium in the mixed solution is 1:50-1:600;

The rate of the agitation is 500-1000 rpm; and 3) finally, by means of high temperature treatment, removing the solvent in the composite and ultimately making the monolayer graphene nanoflakes and the metal or metal oxide form a conductive network useful in a conductive layer, wherein the temperature of the high temperature treatment is 100-350° C.

The conductive graphene-metal composite material of the invention can be used as a conductive electrode used in a transparent conductive layer of a liquid crystal display, for example, a pixel electrode of an array substrate, and an electrostatic shielding layer in a color film substrate.

An embodiment of the present invention further provides a liquid crystal display device comprising a conductive film, wherein the conductive film is formed of the conductive material according to any embodiment of the invention.

Example 1

As shown in FIG. 1, a flow chart of the production process of the graphene-metal composite electrode of the invention is provided. The production process of the graphene-metal composite electrode was as followings.

50 g graphene oxide was taken and heat treated, wherein a rapid heat expansion thereof over 30 sec in a muffle furnace at 1000° C. provided exfoliatable graphite. The resulting exfoliatable graphite was added into 5 L absolute ethanol (density: 0.79, with respect to water). The mixture was treated under an ultrasound of 100 W for 2 h to provide a graphene suspension (comprising monolayer graphene nanoflakes).

The above-mentioned graphene suspension was added into a 5 L N-methyl-2-pyrrolidone, and then dispersed for 30 min by being placed in an ultrasonic cleaner at 100 W. 15 L mixed solution comprising $Al^{3+}$ and $SO_4^{2-}$ (concentration: 10 mol/L) was added therein. The mixture was magnetically stirred (stirring rate: 500 rpm) for 5 h to provide a graphene-metal composite.

The glass substrate was cleaned by rinsing it directly with water. Under the back side of the glass substrate of the array substrate in which all other layers had been prepared on the substrate previously, the graphene-metal composite was plated on the surface of the glass substrate by a dipping process.

The graphene-metal composite electrode (a composite of monolayer graphene nanoflakes and aluminium oxide, weight ratio: 1:160) was produced on the glass substrate by a high temperature treatment at 300° C. under the protection of an inert gas. It could serve as an alternative electrode of the indium tin oxide (ITO) conductive layer, i.e. graphene-metallic aluminium composite electrode.

The graphene-metal composite electrode had improved transparency and conductivity. On the premise of good properties, the costs of processes and facilities were reduced.

Example 2

100 g graphene oxide was taken and heat treated, wherein a rapid heat expansion thereof over 50 sec in a muffle furnace at 1300° C. provided exfoliatable graphite. The resulting exfoliatable graphite was added into 5 L absolute ethanol. The mixture was treated under an ultrasound of 120 W for 2.5 h to provide a graphene suspension.

The graphene suspension was added into an 8 L N-methyl-2-pyrrolidone, and then dispersed for 40 min by being placed in an ultrasonic cleaner at 150 W. 30 L mixed solution comprising $Al^{3+}$ and $SO_4^{2-}$ (concentration: 5 mol/L) was added therein. The mixture was magnetically stirred (600 rpm) for 8 h to provide a composite.

The glass substrate was cleaned by rinsing it directly with water. Under the back side of the lower glass substrate in the FFS mode, in which all other layers had been prepared on the substrate previously, the graphene-metal composite was plated on the glass substrate by a dipping process.

The remaining steps were same as those in Example 1. Thereby a graphene-metal composite electrode (a composite of monolayer graphene nanoflakes and aluminium oxide, weight ratio: 1:81) was produced.

Example 3

50 g graphene oxide was taken and heat treated, wherein a rapid heat expansion thereof over 50 sec in a muffle furnace at 850° C. provided exfoliatable graphite. The resulting exfoliatable graphite was added into 2 L absolute ethanol. The mixture was treated under an ultrasound of 80 W for 2.5 h to provide a graphene suspension.

The graphene suspension was added into an 8 L N-methyl-2-pyrrolidone, and then dispersed for 60 min by being placed in an ultrasonic cleaner at 80 W. 15 L mixed solution comprising $Al^{3+}$ and $SO_4^{2-}$ (concentration: 20 mol/L) was added therein. The mixture was magnetically stirred (800 rpm) for 8 h to provide a composite.

The glass substrate was cleaned by rinsing it directly with water. Under the back side of the lower glass substrate in the FFS mode, in which all other layers had been prepared on the substrate previously, the graphene-metal composite was plated on the glass substrate by a dipping process.

The remaining steps were same as those in Example 1. Thereby a graphene-metal composite electrode (a composite of monolayer graphene nanoflakes and aluminium oxide, weight ratio: 1:324) was produced.

Test Example

The resistances of the transparent conductive layer thin films formed of the graphene-metal composite material of the invention were tested. The comparison between the results of them and an ITO thin film was shown in the table below.

| | Thickness d [Å] | Surface Resistance Rs [Ω/□] | Transmittance (550 nm) |
|---|---|---|---|
| Method of Measurement | K-mac Optical Tester | 4-Probe Tester | SU |
| Indium Tin Oxide (ITO) Thin Film | 400 | 60 ± 15 | 93% |
| Example 1 | 400 | 50 ± 15 | 95% |
| Example 2 | 600 | 60 ± 15 | 94% |
| Example 3 | 1000 | 20 ± 15 | 93% |

From this it could be seen, that compared with ITO thin film, the transparent conductive thin films obtained in the present invention had excellent conductivity and transparency.

Although the invention is described above in detail by a general description and specific embodiments, those skilled in the art will appreciate that it is obvious to them that different changes or modifications can be made without departing the spirit and the principle of the invention. Therefore, all of such changes or modifications should be involved in the extent defined by the claims of the invention.

What is claimed is:

1. A production process of a conductive material, characterized by including the steps of:

1) processing graphite oxide into a graphene suspension comprising graphene monolayer nanoflakes, wherein processing the graphite oxide into the graphene suspension comprising the graphene monolayer nanoflakes includes subjecting the graphite oxide to a heat treatment at a temperature of 850 to 1300° C. for 30-50 seconds; and 2) processing the graphene suspension and metal or metal oxide so as to provide a liquid comprising a composite as the conductive material.

2. The production process according to claim 1, characterized in that the step of processing the graphite oxide into a graphene suspension comprising graphene monolayer nanoflakes includes processing the graphite oxide into a graphene suspension comprising graphene monolayer nanoflakes by utilizing a rapid thermal exfoliation method or a solvothermal method.

3. The production process according to claim 1, characterized in that the step of processing the graphite oxide into a graphene suspension comprising graphene monolayer nanoflakes includes:

adding absolute ethanol into the treated graphite oxide; and subjecting the treated graphite oxide with absolute ethanol added therein to an ultrasonic treatment or a mechanical agitation treatment.

4. The production process according to claim 3, characterized in that the weight ratio of the graphite oxide to the absolute ethanol is 1:20-1:100.

5. The production process according to claim 1, characterized in that the step of processing the graphite oxide into a graphene suspension comprising graphene monolayer nanoflakes includes:

adding absolute ethanol into the treated graphite oxide; and subjecting the graphite oxide with absolute ethanol added therein to an ultrasonic treatment, wherein the power of the ultrasound is 80-150 W and the time of the ultrasonic treatment is 2-2.5 h.

6. The production process according to claim 1, characterized in that the step of processing the graphene suspension and metal or metal oxide so as to provide a liquid comprising a composite includes: subjecting the graphene suspension and metal or metal oxide to an ultrasonic treatment or a mechanical agitation treatment so as to provide a liquid comprising a composite.

7. The production process according to claim 1, characterized in that the step of processing the graphene suspension and metal or metal oxide so as to provide a liquid comprising a composite includes:

mixing the graphene suspension and a solvent, so as to provide a mixture;

subjecting the mixture to ultrasonic dispersion, so as to provide a ultrasonically dispersed mixture; and mixing the ultrasonically dispersed mixture and a salt solution comprising the metal and performing an agitation treatment on it, so as to provide the liquid comprising a composite.

8. The production process according to claim 7, characterized in that the solvent is N-methyl-2-pyrrolidone.

9. The production process according to claim 7, characterized in that the ultrasonic dispersion includes dispersion of 20-60 min under an ultrasound of 80-150 W.

10. The production process according to claim 7, characterized in that the salt solution comprising the metal is a solution comprising $Al^{3+}$ and $SO_4^{2-}$.

11. The production process according to claim 7, characterized in that the duration of the agitation treatment lasts 5-10 h.

12. The production process according to claim 7, characterized in that the weight ratio of the graphene in the graphene suspension to the metal in the salt solution comprising the metal is 1:50-1:600.

* * * * *